(12) United States Patent
Yamakawa

(10) Patent No.: US 7,086,743 B2
(45) Date of Patent: Aug. 8, 2006

(54) REAR PROJECTION TYPE PROJECTOR AND ITS METHOD OF USE

(75) Inventor: Hidemasa Yamakawa, Azusagawa-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/862,889

(22) Filed: Jun. 7, 2004

(65) Prior Publication Data
US 2005/0012906 A1 Jan. 20, 2005

(30) Foreign Application Priority Data
Jun. 6, 2003 (JP) .............................. 2003-161652

(51) Int. Cl.
G03B 21/14 (2006.01)
G03B 21/22 (2006.01)
G03B 21/28 (2006.01)
G03B 21/56 (2006.01)
H04N 3/23 (2006.01)

(52) U.S. Cl. ........................... 353/70; 353/77; 353/79; 359/460; 348/746; 348/747; 345/647; 382/275

(58) Field of Classification Search ................ 353/70, 353/69, 71, 74, 77–79; 359/443, 456, 460; 348/746, 747; 345/647; 382/275
See application file for complete search history.

(56) References Cited

U.S. PATENT DOCUMENTS
5,302,983 A * 4/1994 Sato et al. .................... 353/69
6,233,024 B1 * 5/2001 Hiller et al. ................ 348/744
6,457,834 B1 * 10/2002 Cotton et al. ............... 353/122

FOREIGN PATENT DOCUMENTS
JP 03-015812 1/1991
JP 07-155442 6/1995

OTHER PUBLICATIONS
Communication from Korean Patent /office regarding counterpart application.

* cited by examiner

Primary Examiner—W. B. Perkey
Assistant Examiner—Rochelle Blackman
(74) Attorney, Agent, or Firm—Harness, Dickey & Pierce, P.L.C.

(57) ABSTRACT

A rear projection type projector is provided. An optic axis of modulated light to be projected to a screen projection surface is slanted to a normal N-N of the screen projection surface and projected to a trapezoidal range ABCD housing the actual projection range EFGH. A reflector is disposed in the rear of the screen projection surface, a projection unit projecting modulated light is placed on a side of the screen projection surface, and the modulated light is projected towards the rear, and then reflected at the reflector. Further, image information is corrected and a distortion-free image is projected.

2 Claims, 7 Drawing Sheets

Projected with slanted direction to a normal of a projected surface

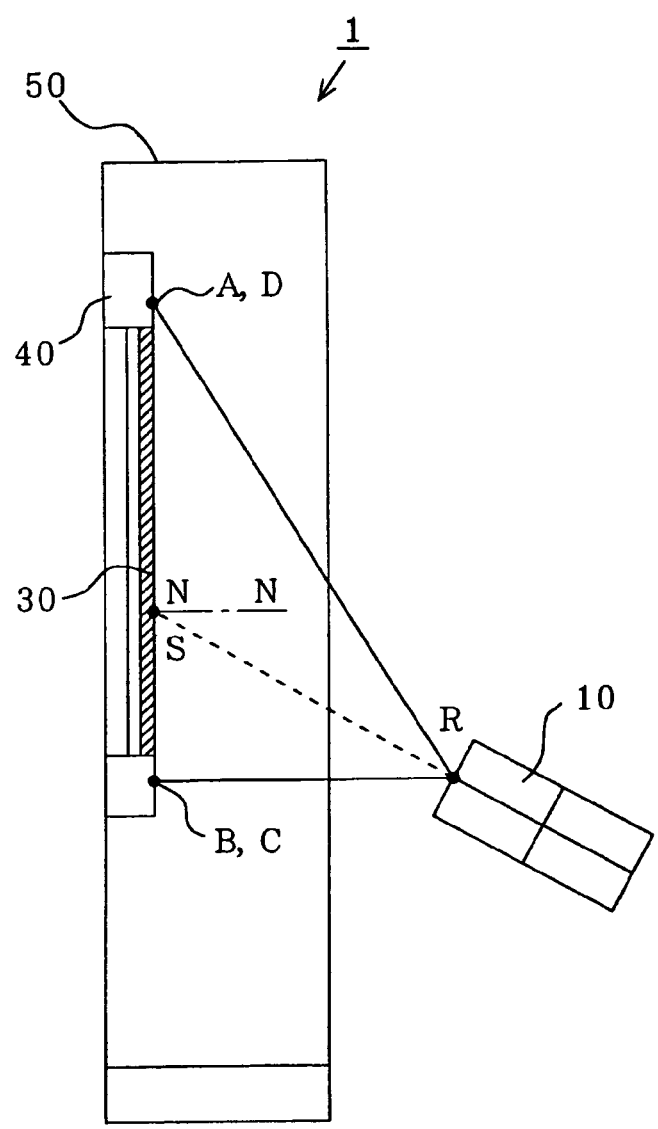
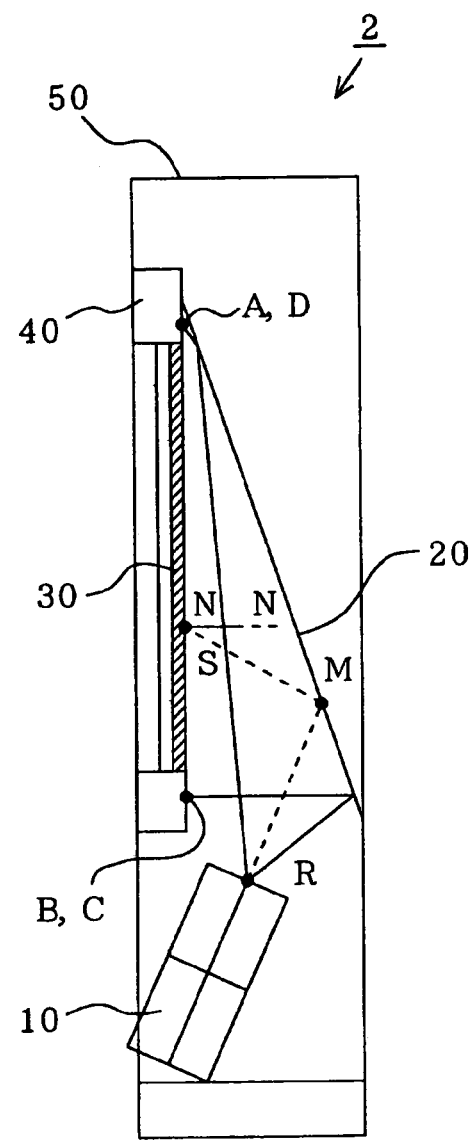
Projected with slanted direction to a normal of a projected surface
Projected with slanted direction to a normal of a projected surface
FIG. 1A
FIG. 1B Projected with slanted direction to a normal of a projected surface An image on a panel Projected with slanted direction to a normal of a projected surface Projected with normal direction to a projected surface

REAR PROJECTION TYPE PROJECTOR AND ITS METHOD OF USE

RELATED APPLICATIONS

This application claims priority to Japanese Patent Application No. 2003-161652 filed Jun. 6, 2003 which is hereby expressly incorporated by reference herein in its entirety.

BACKGROUND

1. Field of the Invention

This invention relates to a rear projection type projector and particularly to a rear projection type projector with projection light projected from the rear of a screen projection surface and its method of use.

2. Description of the Related Art

FIGS. 7(a) and (b) are schematic sectional views of a conventional rear projection type projector, particularly, as a rear projection type projector installed in a playing apparatus, wherein the configuration of FIG. 7(a) is for direct projection, and the configuration of FIG. 7(b) is for projection by way of a reflector.

In FIG. 7(a), a rear projection type projector 5 has a projection unit 10 projecting projection light modulated according to image information and a screen projection surface 30 (shown in slants therein), an optic axis R-S (shown in a dotted line in therein) matching a normal direction N-N of the screen projection surface 30. Consequently, an image faithful to image information is reproduced on the screen projection surface 30. (For example, refer to Japanese Unexamined Patent Publication No. 7-155442 (Page 3, FIG. 1))

Also, in FIG. 7(b), a rear projection type projector 6 has a reflector 20, causing the optic axis (shown in a dotted line in therein) to change its direction at a right angle by using the reflector 20. Namely, projection light (optic axis R-M) emitted from the projection unit 10 in parallel to the screen projection surface 30 is reflected by the reflector 20 to become an optic axis M-S matching the normal N-N of the screen projection surface 30 to be projected to the screen projection surface 30. Now, 40 is a screen frame holding the screen projection surface 30, and 50 is an enclosure in which the screen frame 40 is installed and equipment not illustrated is housed. (For example, refer to Japanese Unexamined Patent Publication No. 7-155442 (Page 4, FIG. 12))

However, since conventional rear projection type projectors 5 and 6 are for reproducing a image of image information on the screen projection surface 30, if the image information is given, for example, by a rectangular liquid crystal panel in an aspect ratio of 4:3 or 16:9, an image actually shown on the screen projection surface 30 (hereinafter referred to as an "actual projection range") becomes rectangular in the same aspect ratio as the aspect ratio of the liquid crystal panel.

FIG. 8 is a front view schematically explaining the actual projection range ratio in the conventional rear projection type projector. A substantially elliptic range EFGH shown in slants therein is a range which a player is able to recognize visually (hereinafter referred to as an "effective projection range"). This effective projection range EFGH may be in various shapes, for example, a rectangle, circle, sector and the like depending on the game machine. On the other hand, a rectangular range TUVW shows an actual projection range of light projected from the projection unit 10.

Now, to facilitate explaining, the screen projection surface 30 is supposed to be set up in a range equal to the effective projection range EFGH, so that light actually projected (actual projection range TUVW) is also supposed to be projected to the screen frame 40 holding the screen projection surface 30. On the other hand, if the screen projection surface 30 is sufficiently wide, the entire actual projection range TUVW is within the screen projection surface 30, part of which is supposed to be recognized visually.

At this time, because the effective projection range EFGH is limited to part of the actual projection range TUVW, a hollow rectangular range (hereinafter referred to as an "invalid projection range") composed of the actual projection range TUVW from which the effective projection range EFGH is removed is subject to irradiation of light in the same way as the effective projection range EFGH, even though it is not recognized visually by the player. Hence, there was a problem of a reduction in efficiency of light utilization in an actually effective range.

Further, to house an effective projection height E-G in the vertical direction within an actual projection range, it is necessary to enlarge an actual projection width in the horizontal direction to a width shown by A-A in the figure, hence, the actual projection width Q-Q enlarges more than necessary relative to the effective projection width Q-Q (the ratio of actual projection width Q-Q relative to the effective projection width F-H is large). Namely, there was a problem that as an image was expanded excessively, the projection distance stretched and the equipment grew in size.

This invention has been made to solve such problems, and it is an object thereof to provide a rear projection type projector by narrowing the invalid projection range to enhance the utilization efficiency of light and shortening the projection distance to enable the equipment to be made small.

SUMMARY

A rear projection type projector according to this invention is a rear projection type projector having a projection unit projecting projection light modulated according to image information and a screen projection surface to which the projection light is projected, wherein an optic axis of the projection light projected to the screen projection surface is slanted relative to a normal of the screen projection surface according to a shape of the screen projection surface.

This enables an image projected to the screen projection surface to be extended in a slant direction. Consequently, an aspect ratio of the screen projection surface (equivalent to the actual projection range) is not limited by an aspect ratio of a liquid crystal panel, and it is possible to project an image limited to a range smaller than a range of housing the screen projection surface. Consequently, the invalid projection range decreases to enhance the utilization efficiency of light, thereby making it possible to improve illuminance of a projected image or reducing capacity of lighting means. Further, because a scale factor of projection decreases, a light path is shortened and the equipment becomes small-sized.

Still further, a rear projection type projector according to this invention comprises being disposed in the rear of the screen projection surface, having a reflector reflecting projection light projected from the projection unit. This enables the actual projection range of the projection light to correspond to the shape of the screen projection surface only by changing an installation posture of the reflector. Furthermore, since the light path of the projection light refracts in a V shape, the equipment becomes small-sized.

Moreover, a rear projection type projector according to this invention comprises the projection unit being disposed on a lower side of the screen projection surface, so that the projection light is projected from the projection unit through the reflector to the screen projection surface. By this means, the projection unit is disposed in a range of being held by the screen projection surface and the reflector, and depth of the equipment (thickness in the front and rear direction) becomes thin.

Further, a rear projection type projector according to this invention comprises a step of converting the image information into virtual image information added with processing to correct an image distortion caused by the slant projection. By this means, an image actually projected to the screen projection surface is made distortion-free.

Still further, a rear projection type projector according to this invention comprises a step of converting into the virtual image information such that pixels on the liquid crystal panel forming the image information are being gradually made narrow in width from a range in which the light path of the projection light became long in keeping with a slant towards a range in which it became short. By this means, virtual image information which underwent trapezoidal correction on the liquid crystal panel is created.

Furthermore, a method of use of a rear projection type projector according to this invention comprises utilizing a rear projection type projector described in either of the above, its screen projection surface being used as a display surface for playing. By this means, there may be used a rear projection type projector to give full game to the performance corresponding to a shape of the display surface for playing.

BRIEF DESCRIPTION OF THE DRAWINGS

FIGS. 1(a) and (b) are sectional views showing a rear projection type projector according to an embodiment of this invention;

DETAILED DESCRIPTION

Rear Projection Type Projector

Figure 2:
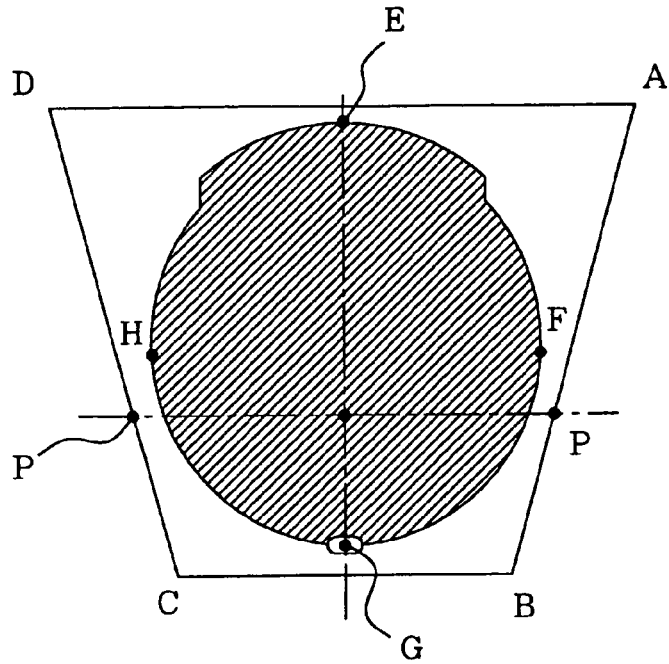
FIG. 2 is a front view explaining an actual projection range in a rear projection type projector.

Referring to the drawings, an embodiment of this invention will be described below. Now, in each drawing, like reference characters designate like or corresponding objects, and part of the description will be omitted.

FIGS. 1(a) and (b) are schematic sectional views of a rear projection type projector according to an embodiment of this invention, wherein FIG. 1(a) shows a case of direct projection and FIG. 1(b) shows a case of projection by way of a reflector.

In FIG. 1(a), a projection direction of a projection unit 10 of a rear projection projector 1 is slanted relative to a screen projection surface 30. Namely, an optic axis R-S of projection light to be projected (shown in a dotted line therein) is slanted at a prescribed angle relative to a normal N-N of the screen projection surface 30. The prescribed angle (hereinafter referred to as an "oblique angle") is an angle which makes the aspect ratio of the actual projection range to be substantially identical to the aspect ratio of the effective projection range. Namely, if the effective projection range is long in the longitudinal direction, the oblique angle becomes large.

In FIG. 1(b), a rear projection type projector 2 is such that a projection light emitted from the projection unit 10 slantwise in the back upward is reflected by the reflector 20 disposed in the rear of the screen projection surface 30 slantwise in the front upward and projected to the screen projection surface 30. Namely, the projection light emitted from the projection unit 10 (an optic axis R-M) is not parallel to the screen projection surface 30, and the optic axis R-M of the projection light reflected at the reflector 20 is not parallel to the normal N-N of the screen projection surface 30.

Particularly, the rear projection type projector 2 has the projection unit 10 which is disposed below the screen projection surface 30 (disposed within a range of depth held by the screen projection surface 30 and the reflector 20) and the projection light once projected from the projection unit 10 towards the back is reflected by the reflector 20 to the front, then projected to the screen projection surface 30, so that the optic axis of the projection light refracts in a V shape, thus making it possible to make a depth of the rear projection type projector 2 thin. Also, since it has the projection unit 10 and an enclosure 50 housing the screen projection surface 30 and the reflector 20, equipment not shown is housed in the enclosure 50 whose thickness is thin in the front and rear direction. Conveyance, storage, and installation are facilitated, while, at the same time, projection environment is protected.

FIG. 2 is a front view schematically explaining the actual projection range in the rear projection type projector according to an embodiment of this invention. In FIG. 2, as mentioned above, inasmuch as the optic axis of the projection light projected is slanted relative to the normal of the screen projection surface 30, the actual projection range is distorted to be long longitudinally so that its aspect ratio becomes closer to the aspect ratio of the effective projection range EFGH (range shown by slants). At this time, the longer the optical path is, the longer it is expanded, therefore, an upper side of the optical path which is longer is stretched in the horizontal direction more than a shorter lower side of the optical path, so that a projected image appears to be a trapezoid in reverse. Further, the actual projection range is reduced as is in similar form (a distance between the projection unit 10 and the screen projection surface 30 is shortened or its magnification of projection lowered) to make its size sufficient to cover the effective projection range EFGH and the actual projection range ABCD illustrated is produced.

Consequently, because the actual projection range ABCD covers the effective projection range EFGH effectively, the invalid projection range decreases to result in improving the utilization efficiency of light considerably. Also, the actual projection width P-P in the horizontal direction becomes close to the effective projection width F-H (a ratio of the actual projection width P-P relative to the effective projection width F-H becomes smaller), hence, for an nonexistent amount of excessive enlargement of the image, the light path of the projection light projected shortens to make the equipment small-sized.

Especially, when the reflector 20 is disposed, only by changing its posture of disposition (oblique angle), it is made possible to facilitate adjusting the actual projection range ABCD.

Now, the above explanation refers to a case where the screen projection surface 30 is identical to the effective projection range EFGH which is a range that can actually be recognized visually. However, the screen projection surface 30 may be made a wider range than the effective projection range EFGH. For example, it may adapted such that a mask having an opening part in a prescribed shape (circular, sector, deformed and the like) is attached additionally to the screen projection surface 30, so that from the front side, only an image over a range of the prescribed shape (equivalent to the effective projection range EFGH) may be visually recognized.

Further, if the effective projection range is longitudinally longer than the liquid crystal panel, in the above case, the optic axis of the projection light projected is slanted within a vertical plane. But if the effective projection range is transversely longer than the liquid crystal panel, the projection unit 10 may be placed on the side of the screen projection surface 30 and the optic axis may be slanted in the horizontal plane.

Correction of Image Distortion

Next, image distortion generated by projecting slantwise relative to the screen projection surface will be described.

Figure 3A:
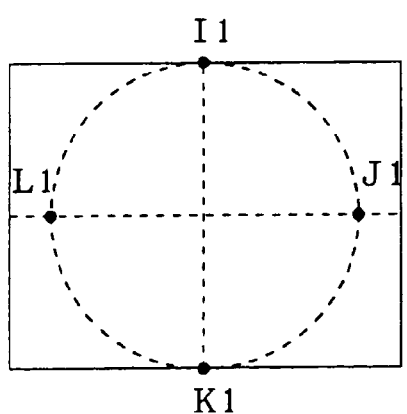
FIGS. 3(a) and (b) are front views explaining correction in a rear projection type projector.
Figure 3B:
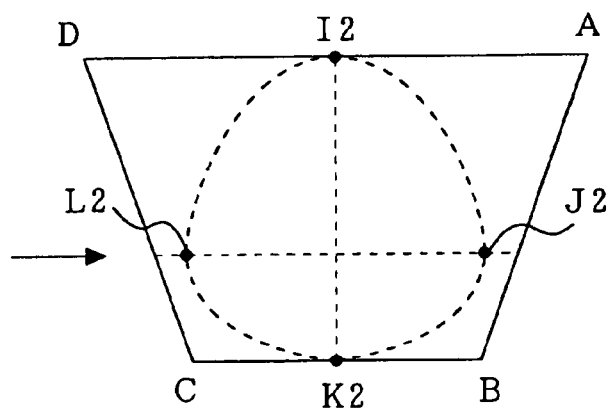
Figures 4A, 4B, 4C:
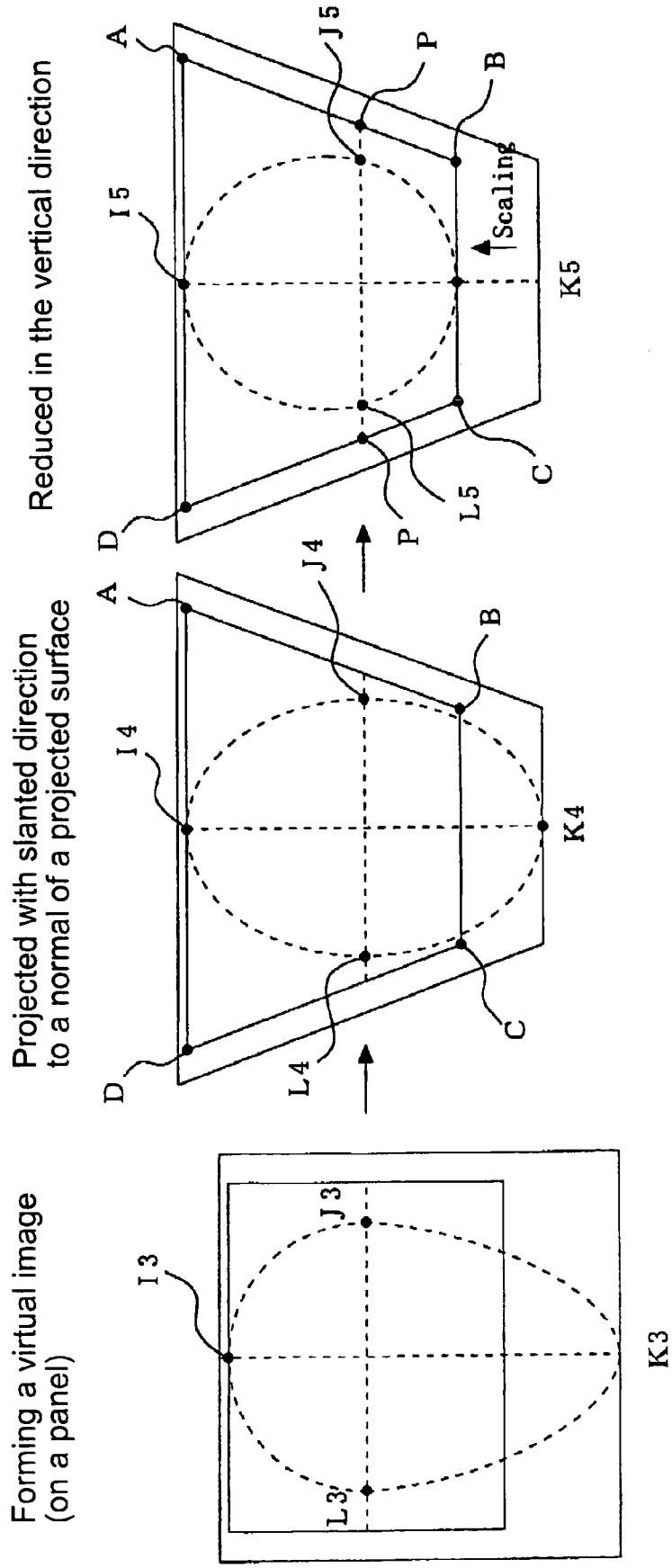
FIGS. 4(a)–(c) are front views explaining correction in a rear projection type projector.

FIG. 3 and FIG. 4 are respectively front views schematically explaining correction of projected images in a rear projection type projector according to an embodiment of this invention, wherein FIGS. 3(*a*) and (*b*) show a case where there is no such correction, and FIGS. 4(*a*)–(*c*) show a case where there is such correction.

In FIG. 3(*a*), there is shown a circular pixel I1J1K1L1 (shown in a dotted line) formed on a rectangular liquid crystal panel (shown in solid lines). At this time, a range of the rectangular liquid crystal panel being actually projected is a trapezoidal actual image range ABCD, and an image corresponding to a circular image I1J1K1L1 presents a pear-shape image I2J2K2L2 (shown in a dotted line in FIG. 3(*b*)).

Namely, since the optic axis of the projection light is slanted to the screen projection surface 30, the actual image range ABCD as a whole is stretched in the vertical direction, further, expanded larger in the horizontal direction in a range of a longer optical path (range of a larger oblique angle), and less expanded in a range of a shorter optical path (range of a smaller oblique angle). As a result, the circular pixel is distorted into the "pear shape."

In FIG. 4(*a*), there is shown a virtual pixel I3J3K3L3 of a "reverse pear shape" on the liquid crystal panel. At this time, an actual projected range is a trapezoidal actual image range ABCD, and a virtual image corresponding to a reverse pear shape pixel I3J3K3L3 presents an elliptic image I4J4K4L4 (shown in a dotted line in FIG. 4(*c*)).

Further, the elliptic image I4J4K4L4 is reduced in the vertical direction (scaling) to make a correction to house it in the actual image range ABCD, and a separate reduction in the horizontal direction is made to produce a circular image I5J5K5L5 (refer to FIG. 4(*c*)).

Accordingly, through the correction, a circular image I5J5K5L4 similar to the circular image I1J1K1L1 is obtained on the screen projection surface. Namely, in addition to original image information which tries to project such correction, by converting it to virtual image information and running such virtual image information through the liquid crystal panel, an image having little distortion is finally projected to the screen projection surface.

Control System of the Projection Unit

Figure 5:
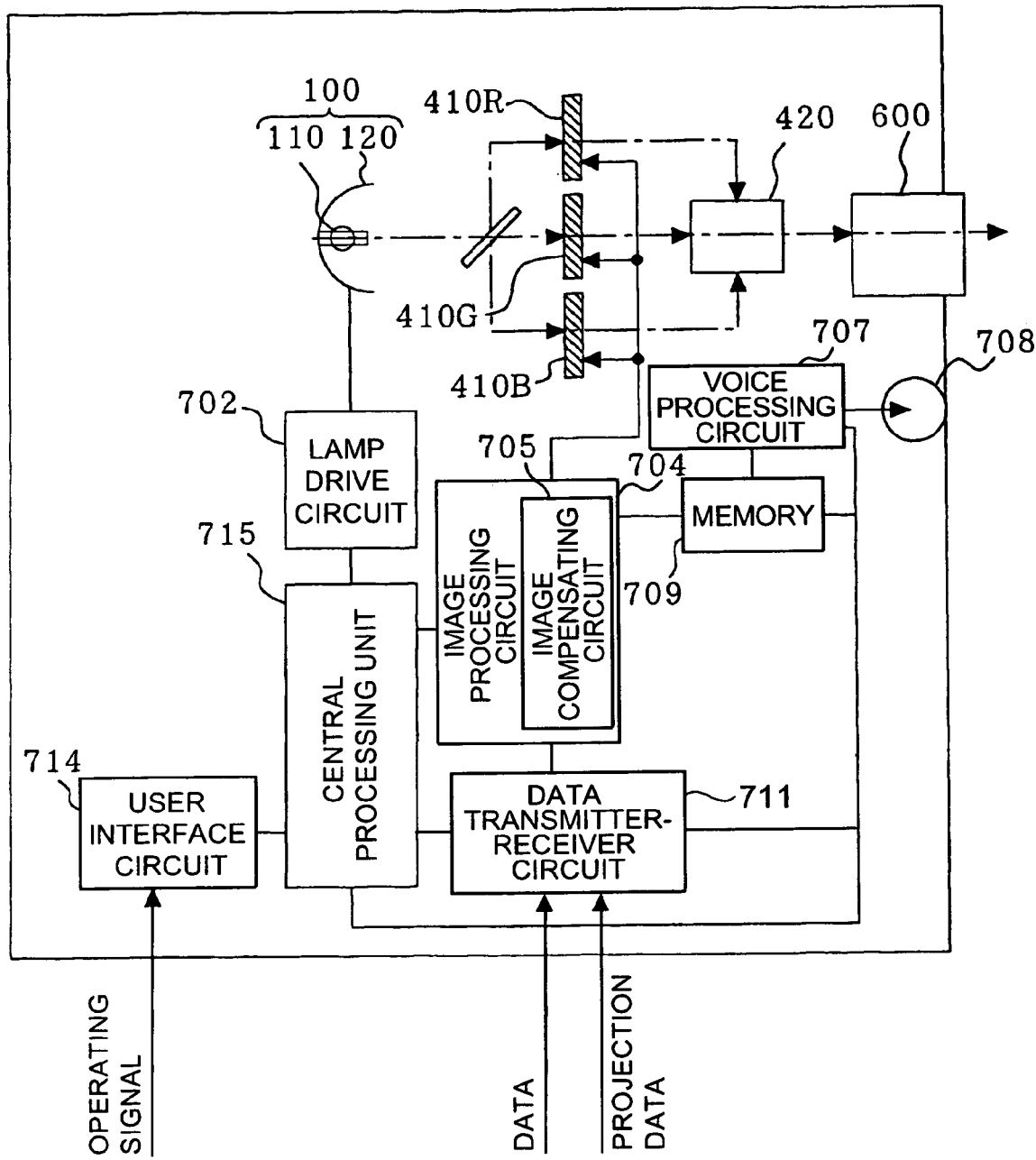
FIG. 5 is a block diagram showing a control system of a projection unit in a rear projection type projector.

FIG. 5 is a block diagram showing a control system of the projection unit 10 according to an embodiment of this invention. This control system includes a lamp 100, liquid crystal panels 410R, 410G, 410B, a cross dichroic prism 420, a projection lens 600, a lamp drive circuit 702, an image processing circuit 704, an image correction circuit 705, a voice processing circuit 707, a speaker 708, a memory 709, a data transmitter-receiver circuit 711, a user interface circuit 714, a central processing unit 715 and the like.

The lamp drive circuit 702 is for driving the lamp 100, and a voltage and a current to be supplied to the lamp 100 are subject to final adjustment therein.

The image processing circuit 704 is a circuit where image signals and control signals needed for generating images in the liquid crystal panels 410R, 410G, and 410B are processed.

The image correction circuit 705 is installed in the image processing circuit 704 and converts original image information to be projected according to projecting conditions such as the oblique angle into virtual image information.

The voice processing circuit 707 is a circuit for processing voice signals to cause the speaker 708 to output voice.

The memory 709 is for storing and holding various types of information in the projection unit, and projection related data (image data, the oblique angle of the optic axis and the like) as well as other data are stored there.

The data transmitter-receiver circuit 711 is an interface circuit for taking projection data and other data from outside the projection unit 10 into the projection unit. The prescribed values mentioned above regarding the liquid crystal panels taken in therefrom are transmitted to the memory 709 and stored. Now, if data reception suffices here, this part may be a circuit only for receiving data. However, it is adapted such that the data transmitter-receiver circuit 711 is provided to enable the projection unit 10 to transmit data to any external device.

The user interface circuit 714 is a circuit for inputting signals for carrying out operation of the projection unit 10 as well as a circuit which receives operating signals from an operation part attached to the projection unit 10 or a remote control.

The central processing unit 715 is for executing prescribed operations by appropriately relating each part (each circuit and the like) that has been thus far described, comprising a CPU, RAM and the like.

Configuration of the Projection Unit

Figure 6:
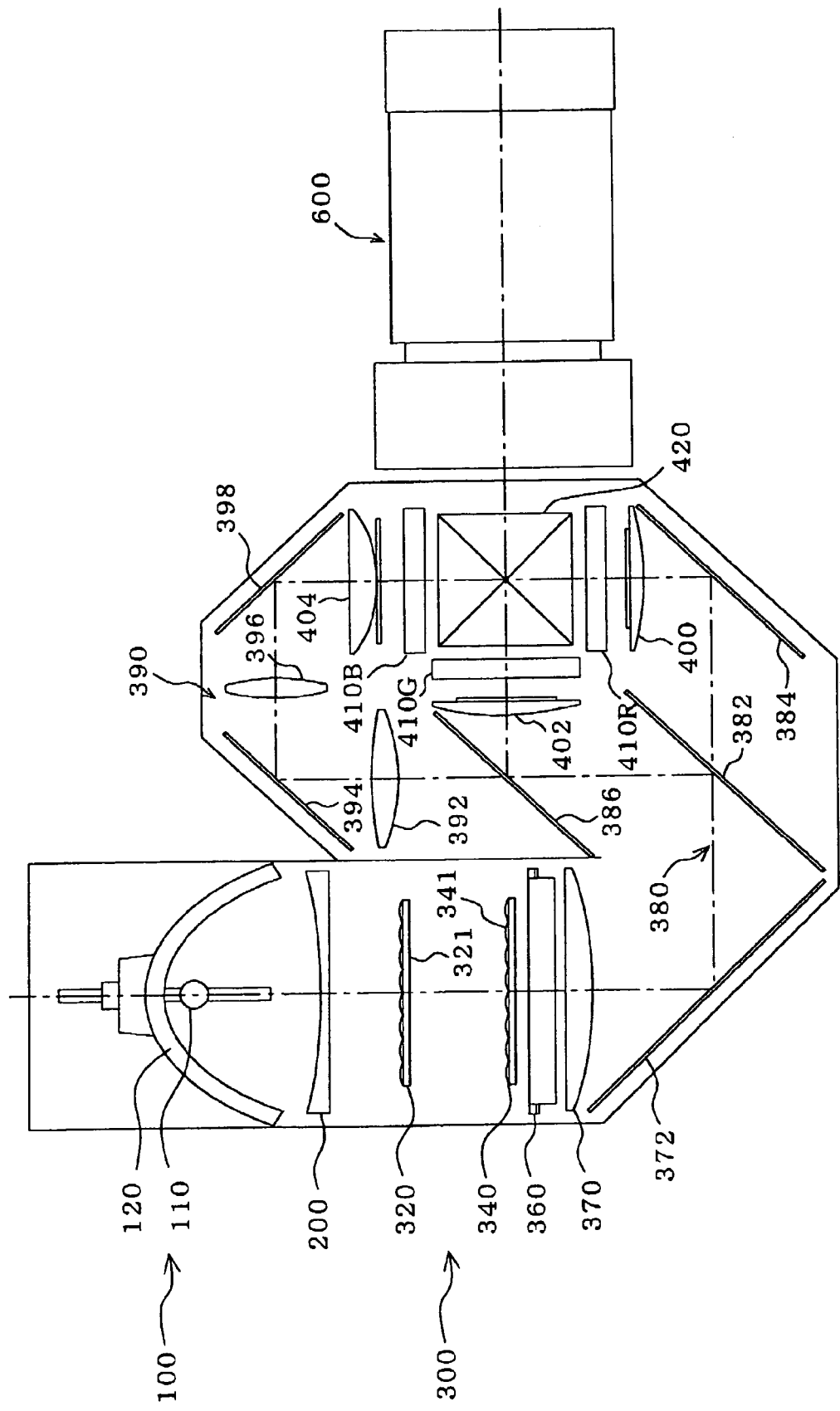
FIG. 6 is a configuration diagram of a projection unit in a rear projection type projector.
Figure 7A:
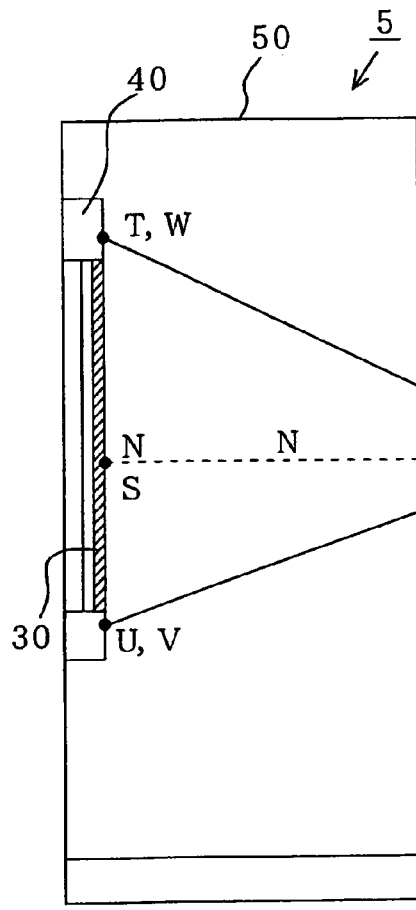
FIGS. 7(a) and (b) are sectional views schematically showing a conventional rear projection type projector.
Figure 7B:
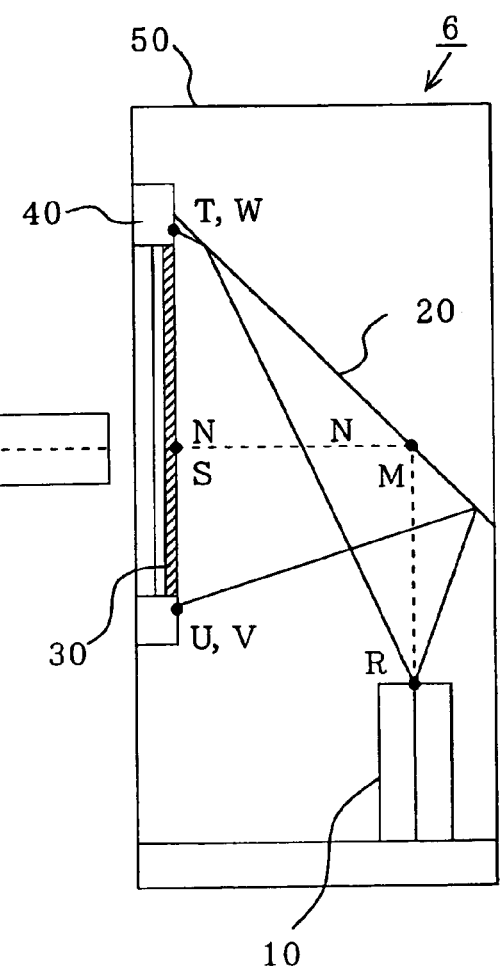
Figure 8:
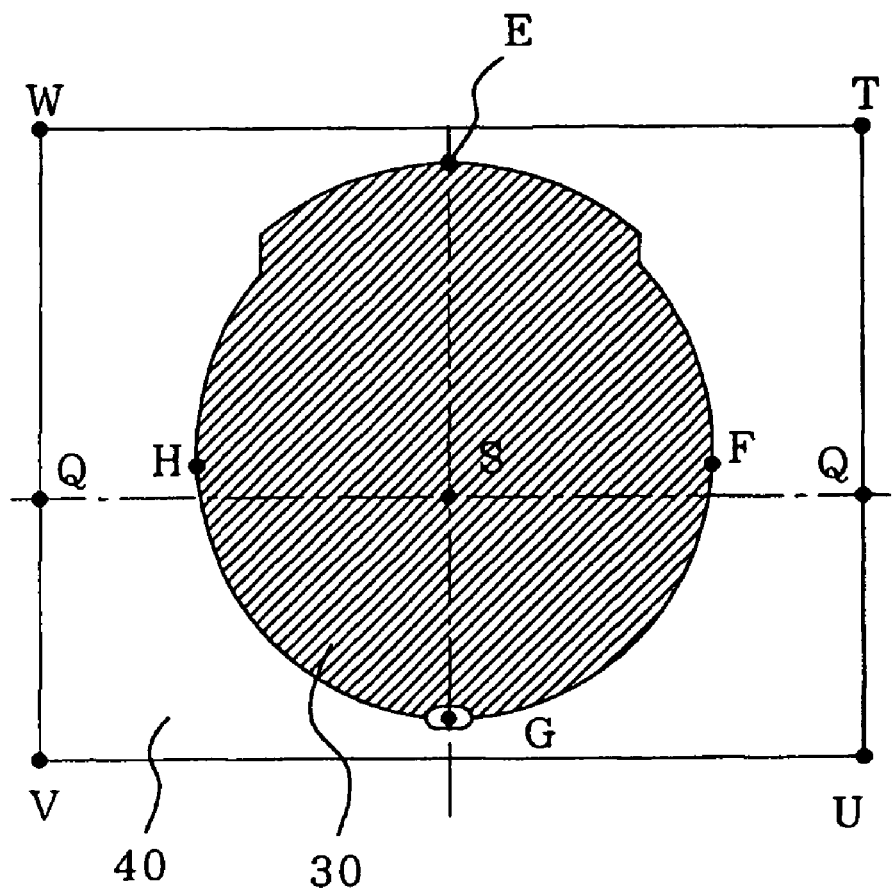
FIG. 8 is a front view explaining an actual projection range of a conventional rear projection type projector.

FIG. 6 is a configuration diagram of the projection unit of a rear projection type projector according to an embodiment of this invention. In FIG. 5, this optical system includes a lamp 100 constituted by a light-emitting tube 110 and a reflector 120, an illumination optical system 300 equipped with means to adjust light emitted from the lamp 100 to prescribed light, a color light separation optical system 380, a relay optical system having an incident side lens 392, a relay lens 396, reflectors 394 and 398, field lenses 400, 402, and 404 corresponding to each color light, and liquid crystal panels 410R, 410G, and 410B as light modulators, a cross dichroic prism 420 which is a color light synthesis optical system, and a projection lens 600.

Next, action of the projection unit of the above configuration will be described. The lamp 100 is a lighting source of the projection unit 10, and of the rays of light emitted from the center of a light-emitting part of the light-emitting tube 110, those rays going to the rear are reflected by the reflector 120 and emitted towards the front. Light that went out of the lamp 100 enters a concave lens 200, where the advancing direction of light is adjusted to be made substantially parallel to an optical axis of the illumination optical system 300, then enters each small lens 321 of a first lens array 320 making up an integrator lens.

The first lens array 320 splits incident light into a plurality of partial luminous fluxes according to a number of small lenses 321. Each partial light flux leaving the first lens array 320 enters a second lens array 340 making up an integrator lens having small lenses 341 respectively corresponding to each small lens 321. And light emitted from the second lens array 340 is focused on vicinities of polarized separation films (not shown) corresponding to a polarizing conversion element array 360. At this time, by means of a shielding plate (not shown), it is adjusted such that light from light incident to the polarizing conversion element array 360 enters only a part corresponding to the polarizing separation films.

In the polarizing conversion element array 360, the luminous flux incident thereto is converted to the same kind of straight line polarization. And the plurality of partial luminous fluxes whose direction of polarization was arranged properly in the polarizing conversion element array 360 enter a superimposed lens 370, where each partial luminous flux irradiating the liquid crystal panels 410R, 410G, and 410B is adjusted in a manner of piling one on top of another on a corresponding liquid crystal panel.

The color light separation optical system 380 comprises a first and a second dichroic mirror 382 and 386, having a function to separate light emitted from the illumination optical system into color lights in 3 colors of red, green, and blue. The first dichroic mirror 382 transmits a red color component out of light emitted from the superimposed lens 370, while reflecting a blue color component and a green color component. The red color component transmitted by the first dichroic mirror 382 is reflected by a reflector 384 and goes through a field lens 0.400 to reach the liquid crystal panel for the red light. This field lens 400 converts each partial luminous flux emitted from the superimposed lens 370 into a flux parallel to its central axis (main light). Field lenses 410G and 410B installed in front of other liquid crystal panels 410G and 410B also function in the same way.

Further, of blue light and green light reflected by the first dichroic mirror 382, the green light is reflected by the second dichroic mirror 386, transmitted by the field lens 402, and reaches the liquid crystal panel 410G for the green light. On the other hand, the blue light is transmitted by the second dichroic mirror 386, passing through the relay optical system 390, that is, the incident side lens 392, the reflector 394, the relay lens 396, and the reflector 398, and further through the field lens 404, reaching the liquid crystal panel for the blue light.

A reason for using the relay optical system 390 for the blue light is for preventing the utilization efficiency of light from decreasing due to light dissipation and the like because the light path length of the blue light is longer than the light path lengths of the lights of other colors. Namely, it is for imparting the partial luminous flux incident to the incident side lens 392 as is to the field lens 404. The relay optical system 390 is configured such that it transmits only the blue light, but this may be configured such that it may transmit other color lights such as the red light.

The three liquid crystal panels 410R, 410G, and 410B modulate each incident color light according to the image information provided and form an image of each color light. On a light incident surface side and a light irradiation surface side of the three liquid crystal panels 410 R, 410G, and 410B, there are normally installed polarization plates.

Three-color modulated lights emitted from each of the liquid crystal panels 410R, 410G, and 410B enter the cross dichroic prism 420 which has a function as the color light synthesis optical system forming color images by synthesizing these modulated lights. In the cross dichroic prism 420, a dielectric multi-layer film reflecting the red light and a dielectric multi-layer film reflecting the blue light are formed on four interfaces of a right-angled prism substantially in the shape of an X. By means of these dielectric multi-layer films, the modulated lights of three colors of red, green, and blue are synthesized, and the modulated color synthetic lights are formed for projecting color images. The modulated color synthetic lights synthesized in the cross dichroic prism 420 enter the projection lens 600 in the end to be projected therefrom to the screen and displayed as color images.

Now, the above explanation was made by citing the projection unit using the transmission type liquid crystal panels as an example. However, this invention is also applicable to the projection unit using reflective type liquid crystal panels. In this context, the "transmission type" means a type in which a light modulator such as a liquid crystal panel transmits light, and the "reflective type" means a type in which it reflects light. Also, the light modulator is not limited to the liquid crystal panel. For example, it may be a device using micro mirrors placed in a rectangular shape.

What is claimed is:

1. A rear type projector comprising:
    a projection unit that projects projection light modulated according to an image formation;
    a screen projection surface to which the projection light is projected and
    a liquid crystal panel that forms the image information, wherein:
    an optic axis of the projection light being projected to the screen projection surface is slanted relative to a normal of the screen projection surface according to a shape of the screen projection surface;
    the projection unit is disposed behind the screen projection surface and a reflector reflects the projection light projected from the projection unit;
    the image information is converted into virtual image information having image distortion caused by a slanted projection subjected to correction processing; and
    the conversion to the virtual image information makes pixels on the liquid crystal panel narrower in width due to a range of a light oath of the projection light becoming longer corresponding to the slant towards a shorter range.

2. The rear type projection type projector according to claim 1, wherein:
    the projection unit is disposed at a lower side of the screen projection surface, and the projection light is projected from the projection unit by way of the reflector to the screen projection surface.

* * * * *